(12) United States Patent  
Yamauchi

(10) Patent No.: US 8,162,402 B2  
(45) Date of Patent: Apr. 24, 2012

(54) VEHICULAR SEATS

(75) Inventor: Katsuhito Yamauchi, Seto (JP)

(73) Assignees: Toyota Boshoku Kabushikia Kaisha, Aichi-Ken (JP); Toyota Boshoku America, Inc., Novi, MI (US)

( * ) Notice: Subject to any disclaimer, the term of this patent is extended or adjusted under 35 U.S.C. 154(b) by 291 days.

(21) Appl. No.: 12/258,801

(22) Filed: Oct. 27, 2008

(65) Prior Publication Data

US 2010/0102615 A1  Apr. 29, 2010

(51) Int. Cl.
*A47C 7/02* (2006.01)

(52) U.S. Cl. ......... 297/452.48; 297/452.21; 297/452.29; 297/452.32

(58) Field of Classification Search ............ 297/452.21, 297/452.23, 452.26, 452.29, 452.31–452.37, 297/452.48, 452.58
See application file for complete search history.

(56) References Cited

U.S. PATENT DOCUMENTS

| | | | |
|---|---|---|---|
| 1,541,213 A | 6/1925 | Harley | |
| 2,012,042 A * | 8/1935 | Gerlofson et al. | 267/145 |
| 2,552,039 A * | 5/1951 | Flogaus | 297/452.26 |
| 2,826,135 A * | 3/1958 | Benzick | 454/120 |
| 2,978,972 A | 4/1961 | Hake | |
| 2,992,604 A | 7/1961 | Trotman et al. | |
| 3,136,577 A | 6/1964 | Richard | |
| 3,162,489 A | 12/1964 | Trotman | |
| 3,209,380 A | 10/1965 | Watsky | |
| 3,550,523 A | 12/1970 | Segal | |
| 4,379,352 A | 4/1983 | Hauslein et al. | |
| 4,383,342 A * | 5/1983 | Forster | 5/731 |
| 4,563,387 A | 1/1986 | Takagi et al. | |
| 4,777,802 A | 10/1988 | Feher | |
| 4,923,248 A | 5/1990 | Feher | |
| 5,002,336 A | 3/1991 | Feher | |
| 5,226,188 A | 7/1993 | Liou | |
| 5,522,106 A | 6/1996 | Harrison et al. | |
| 6,089,657 A * | 7/2000 | Banno et al. | 297/218.1 |

FOREIGN PATENT DOCUMENTS

| | | |
|---|---|---|
| JP | 53-080603 U | 7/1978 |
| JP | 54-097212 U | 7/1979 |
| JP | 58-185952 U | 10/1983 |
| JP | 60-012095 A | 1/1985 |
| JP | 61-194354 U | 12/1986 |
| JP | 5-023235 A | 2/1993 |
| JP | 5-010700 Y2 | 3/1993 |
| JP | 2005-046425 A | 2/2005 |

OTHER PUBLICATIONS

English language Abstract of JP 2005-046425 A; Feb. 24, 2005.
English language partial translation of JP 5-010700 Y2; Mar. 16, 1993.
English language Abstract and partial translation of JP 5-023235 A; Feb. 2, 1993.
English language partial translation of JP 61-194354 U; Dec. 3, 1986.

(Continued)

*Primary Examiner* — David Dunn
*Assistant Examiner* — Philip Gabler
(74) *Attorney, Agent, or Firm* — Greenblum & Bernstein, P.L.C.

(57) ABSTRACT

A vehicular seat has a pad including a foamed elastic material and a skin member covering a surface of the pad. A groove is formed at the surface of the pad, and the groove is inclined to a line orthogonal to the surface of the pad.

11 Claims, 6 Drawing Sheets

OTHER PUBLICATIONS

English language partial translation of JP 54-097212 U; Jul. 9, 1979.
English language Abstract and partial translation of JP 58-185952 U; Oct. 29, 1983.

U.S. Appl. No. 11/875,255 to Wissner et al., filed Oct. 19, 2007.
U.S. Appl. No. 11/876,919 to Wissner et al., filed Oct. 23, 2007.

* cited by examiner

VEHICULAR SEATS

BACKGROUND OF THE INVENTION

1. Field of the Invention

The present invention relates to a vehicular seat used in a vehicle of a car or the like.

2. Description of the Related Art

In general, a vehicular seat includes a seat cushion on which a user is seated and a seat back for supporting the back of the user. The seat cushion and the seat back include pads comprising urethane foam members and skin members covering the pads. In a background art, there is disclosed a seat devised in a hardness of a pad in order to promote a seating comfortableness of a seat (U.S. Pat. No. 5,522,106). Further, in a background art, there is also disclosed a seat having a groove (JP-A 2005-46425). The groove is used for smoothly exhausting air at inside of a pad when the user is seated on the seat, thereby achieving a pertinent cushioning performance.

However, there is need in the art for a more comfortable seat to promote ease of use.

SUMMARY OF THE INVENTION

One aspect of the present invention can include a vehicular seat has a pad including a foamed elastic material and a skin member covering a surface of the pad. A groove is formed at the surface of the pad, and the groove is inclined to a line orthogonal to the surface of the pad.

Therefore, the stiffness of the surface side of the pad may degrade because the groove is formed at the surface of the pad. Further, the pad more easily deform in the desired direction along inclinations of the groove. Thereby, seating comfortableness of the vehicular seat can be promoted.

In another aspect of the present invention, a vehicular seat includes a pad and skin member. A groove is formed at the surface of the pad, the groove extends in a spiral shape along the surface.

Therefore, deformation of the pad can continuously and smoothly be carried by a spiral shaped groove. Thus, the load applied to the pad can be smoothly dispersed, and portions of the pad can be prevented from being recessed partially or suddenly. In this way, the seating comfortableness of the vehicular seat can be promoted.

DETAILED DESCRIPTION OF THE INVENTION

Each of the additional features and teachings disclosed above and below may be utilized separately or in conjunction with other features and teachings to provide improved vehicular seats. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
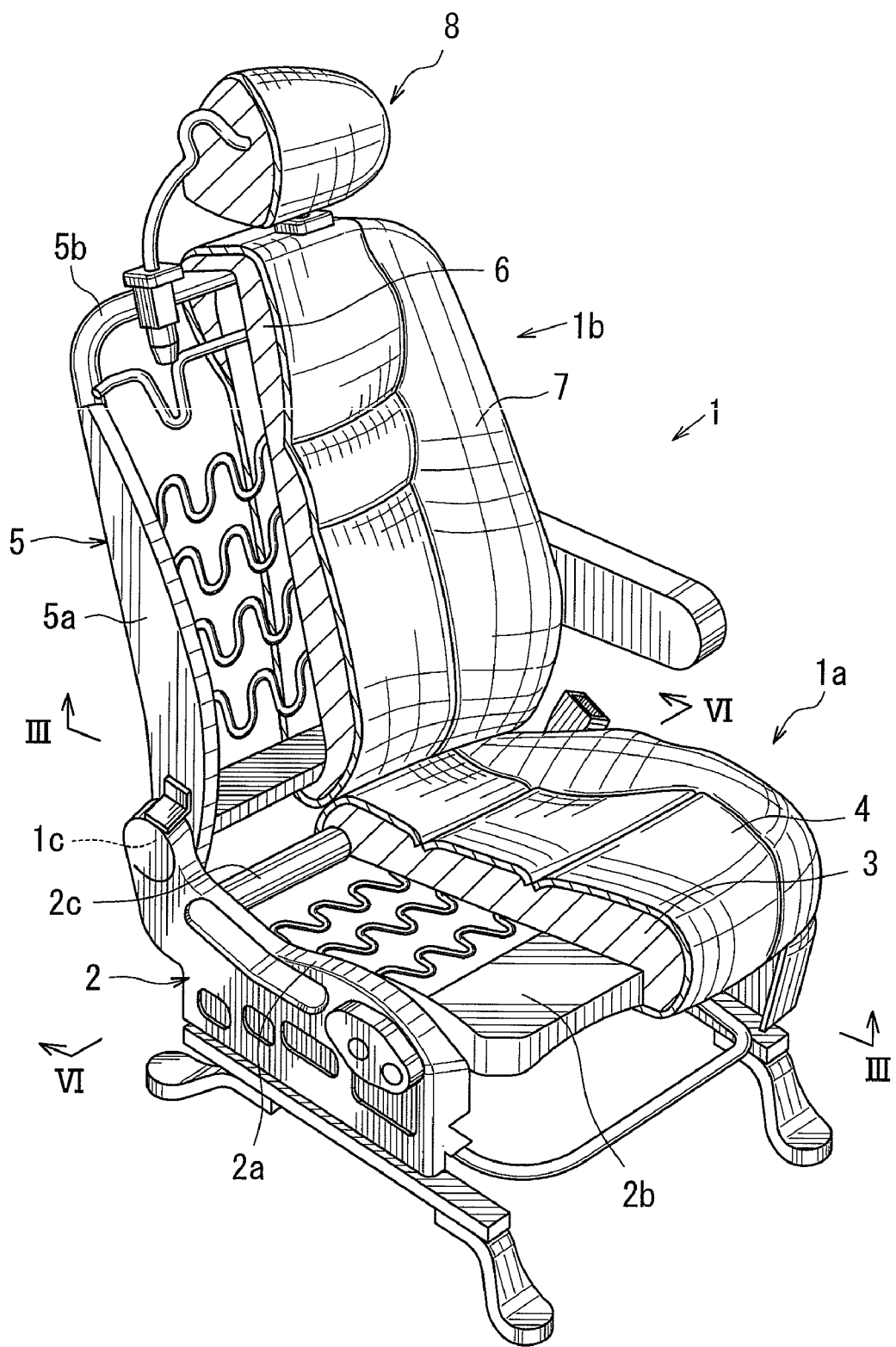
FIG. 1 is a perspective view of a vehicular seat with a portion of a pad and a skin member removed.
Figure 3:
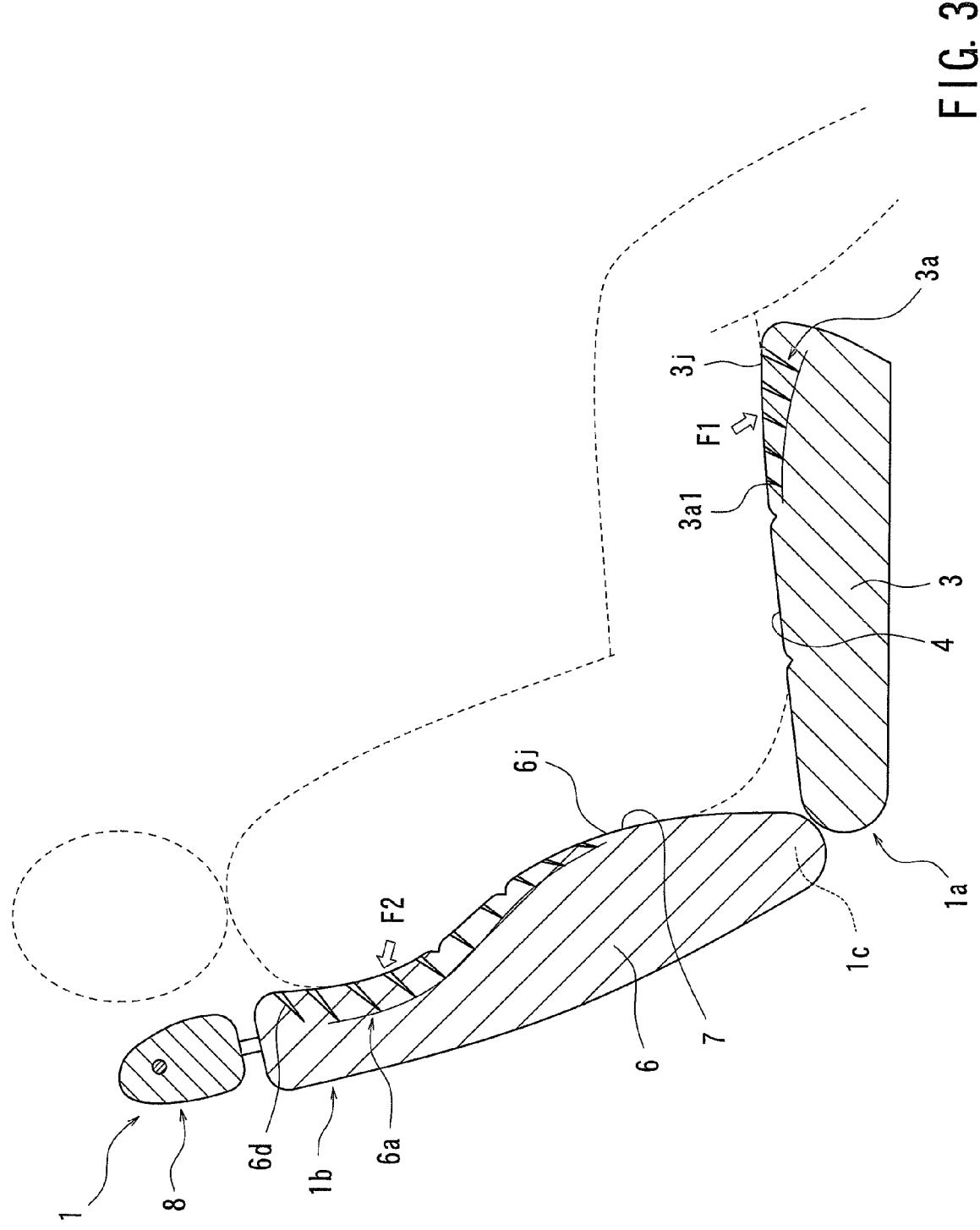
FIG. 3 is a diagrammatic cross-sectional view taken along line III-III in FIG. 1.

As shown in FIGS. 1 and 3, a vehicular seat 1 is a seat used in a vehicle (e.g. a car or the like) and includes a seat cushion 1a on which a user can be seated and a seat back 1b for supporting the back of the user. A reclining apparatus 1c is provided between and connecting the seat cushion 1a and the seat back 1b to allow adjustment of an angle therebetween. The seat cushion 1a and the seat back 1b include frames 2, 5, pads 3, 6 and skin members 4, 7 covering the pads 3, 6.

The frame 2 of the seat cushion 1a includes left and right side frames 2a and a front frame 2b for connecting front portions of the side frames 2a, and a rear frame 2c for connecting rear portions of the side frames 2a as shown in FIG. 1. The frame 5 of the seat back 1b includes left and right side frames 5a, and an upper frame 5b for connecting upper portions of the side frames 5a. The upper frame 5b is attached with a head rest 8 to be able to adjust a position thereof in an up and down direction.

The pads 3, 6 are molded from a foamed elastic material, and the foamed elastic material is a resin foamed material constituting a raw material by a resin of, for example, urethane or the like. The pads 3, 6 are formed with grooves 3a through 3e, 6a through 6d, which allow pads 3, 6 to elastically deform in desired directions and amounts. The grooves 3a through 3e, 6a through 6d are formed on sides of surfaces 3j, 6j of the pads 3, 6 (refer to FIGS. 3, 5, 6).

Figure 2:
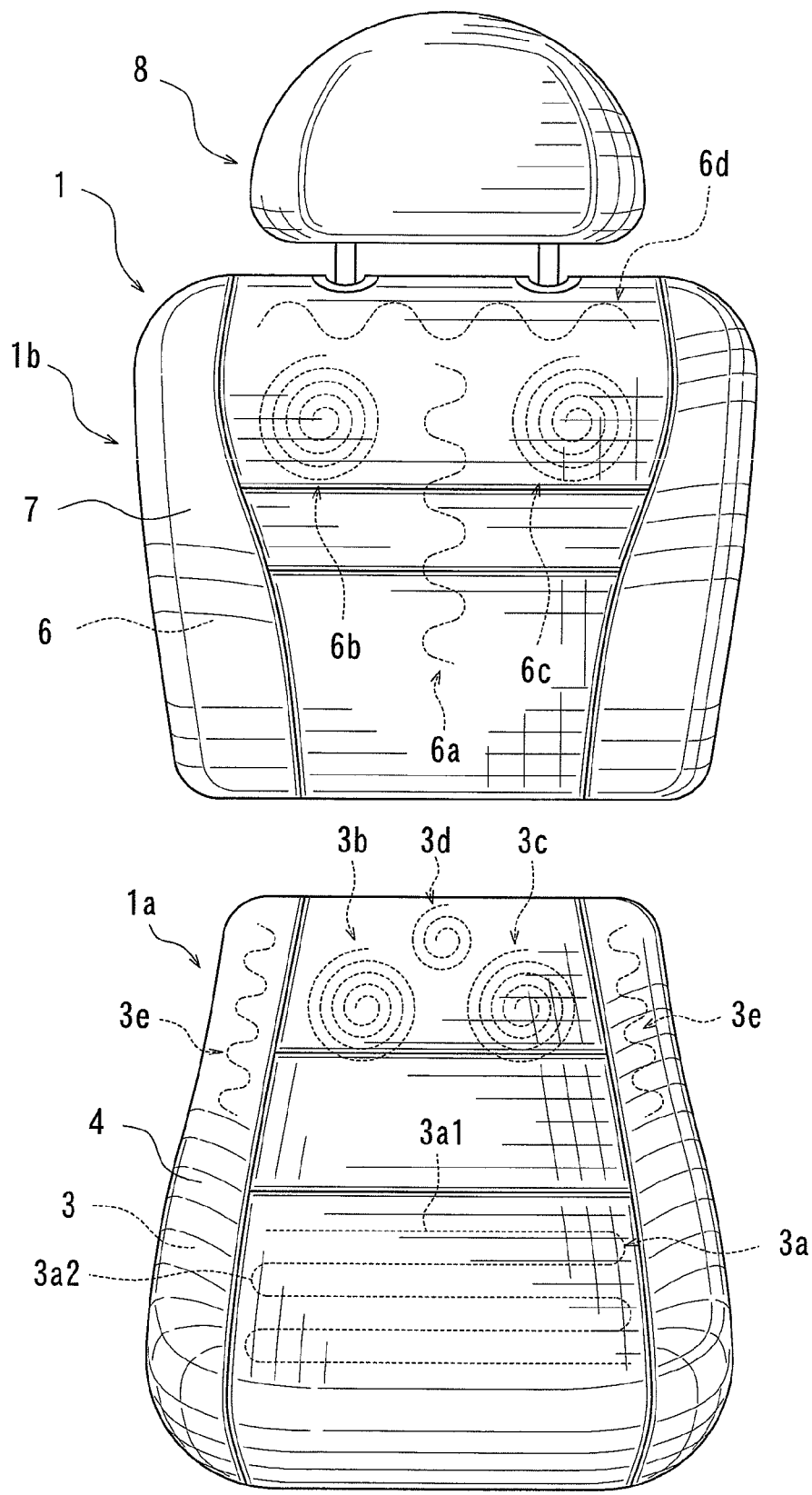
FIG. 2 is a front view of a seat cushion and a seat back.

The groove 3a is formed in the pad 3 at a front side portion of the seat cushion 1a as shown in FIG. 2. The groove 3a includes a plurality of width direction grooves 3a1 extended in a width direction, and a plurality of connecting grooves 3a2 for connecting the width direction grooves 3a1. A length of the width direction groove 3a1 can be defined as half to three quarters of a width of the seat cushion 1a. Intervals in a front and rear direction of the width direction grooves 3a1 are constituted substantially by equal intervals of 30 through 150 mm. The connecting groove 3a2 is constituted by a curved shape and connects end portions of the width direction groove 3a1. Therefore, the groove 3a is constituted by a shape of one piece line in which a plurality of S-shaped lines are continuously extended.

As shown in FIG. 3, the depth of groove 3a is stepped or tapered from a front side to a rear side of the seat cushion 1a. For example, a plurality of rows of the width direction grooves 3a1 differ in depth from each other. For example, the more front row the width direction groove 3a1 is disposed, the deeper the width direction groove 3a1. Further, in this embodiment, the stepped or tapered configuration of the plurality of grooves, proximate the front side of the pad 3, allows pad 3 to be more easily deformed in force F1 direction. Further, the depth of the groove 3a is changed in steps, and therefore, the elastic deformation of the pad 3 becomes smooth, and a strange feeling is reduced for the user. Further, the groove 3a is provided with an angle of inclination relative to the surface 3j of the pad 3. In details, the groove 3a is inclined such that a bottom portion thereof is disposed on a rear side of an opening portion thereof. Therefore, the front side portion of the pad 3 can be easily elastically deformed in a direction of moving the surface 3j to the front side.

As shown in FIG. 3, the pad 3 at the front side portion of the seat cushion 1a receives a force F1 in a front lower direction by the thigh of the user. For example, the force F1 is exerted from the thigh to the pad 3 when the user steps on a brake pedal or a pedal of accelerator brake or the like. In response thereto, the pad 3 can easy elastically deform in a direction the same as that of the force F1 because the groove 3a has an inclination. Further, in this embodiment, the stepped or tapered configuration of the plurality of grooves, proximate the front side of the pad 3, allows pad 3 to be more easily deformed in the force F1 direction. Therefore, a force from a side of the pad 3 directed to the user lessens when the user steps on the pedal. This allows the user to more easily operate the pedal. Further, the seating comfortableness is promoted.

Figure 7:
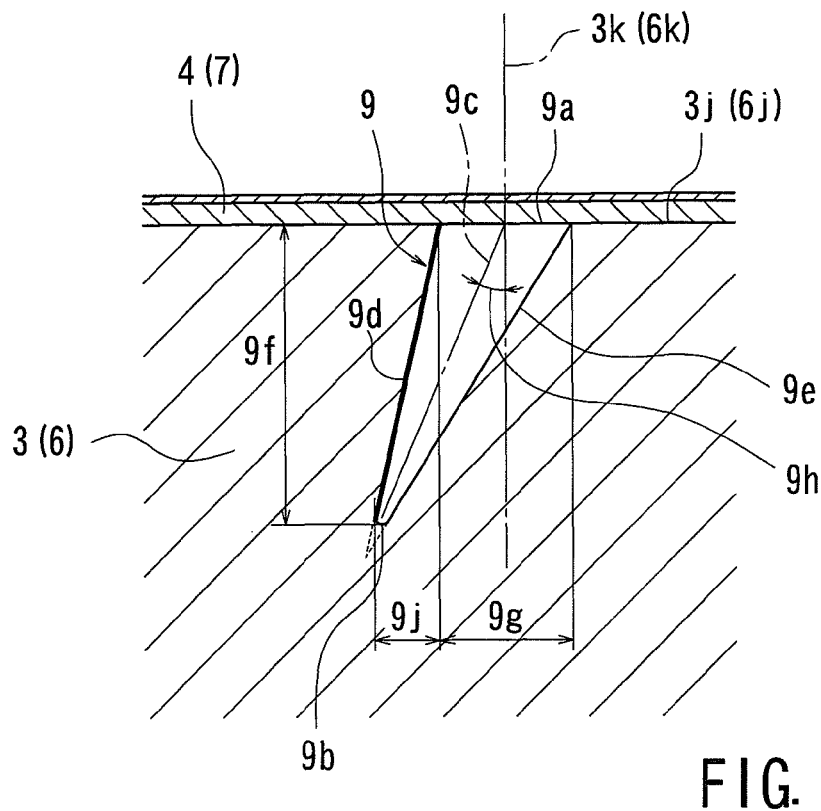
FIG. 7 is a cross-sectional view of the groove.

The grooves 3a through 3e, 6a through 6d are provided with substantially the same groove sections 9 (refer to FIG. 7). The groove section 9 includes an opening portion 9a opened to the surface 3j, 6j of the pad 3, 6. A bottom portion 9b can be rounded, for example, as a result of using a molding die. The groove section 9 is inclined to a line 3k, 6k orthogonal to the surface 3j, 6j of the pad 3, 6, and is provided with an angle of inclination 9h between a groove center line 9c connecting a center of the opening portion 9a and a center of the bottom portion 9b and the orthogonal line 3k, 6k. The groove section 9 is configured in a substantially triangular shape, a width thereof is gradually narrowed from the opening portion 9a to the bottom portion 9b and includes wall surfaces 9d, 9e at both side positions thereof. Both of the wall surfaces 9d, 9e are inclined in the same direction relative to the orthogonal lines 3k, 6k.

As shown in FIG. 2, the pad 3 includes grooves 3b through 3d in a spiral shape. The grooves 3b, 3c are formed at left and right positions of a position in correspondence with the hip bones (expanded portions) of the user, that is, at left and right positions of a width center region of a rear portion of the pad 3. The groove 3d is formed at the position in correspondence with the tailbone (expanded portion) of the user, that is, at the width center position of a rear end portion of the pad 3. The grooves 3b through 3d are substantially similarly formed and the groove 3b will be explained as follows.

Figure 4:
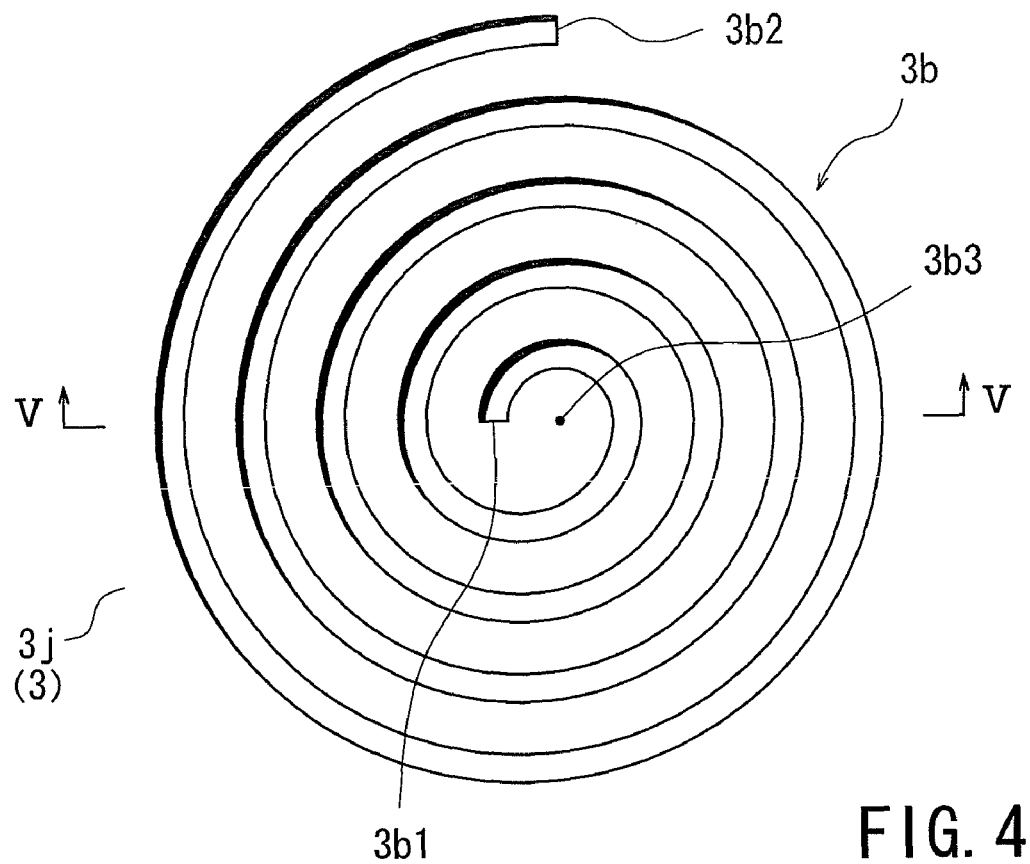
FIG. 4 is a front view of a spiral groove.

The groove 3b is constituted by the spiral shape as shown in FIG. 4 and is formed by one piece line. The groove 3b includes one end portion 3b1 at a vicinity of a spiral center 3b3. And the groove 3b extends in a spiral shape along the surface 3j of the pad 3, that is, gradually separated from the spiral center 3b3 while turning around the spiral center 3b3 from the one end portion 3b1. And the groove 3b includes other end portion 3b2 at a tip end thereof.

Further, the groove 3b is inclined to a line orthogonal to the surface 3j of the pad 3. In detail, the groove 3b is inclined such that the bottom portion is disposed on a side of the spiral center 3b3 more so than the opening portion. Therefore, the pad 3 can more easily be elastically deformed in a direction similar to when the side of the surface 3j is moved from the side of the spiral center 3b3 of the groove 3b to the outer side. Thus, a force applied to the pad 3 can be dispersed from the center of the groove 3b to the outer side. Further, the groove 3b has the spiral shape, so that the elastic deformation of the pad 3 is continuous to prevent a portion thereof from being recessed suddenly. Further, continuous elastic deformation is produced, and therefore, an amount of elastic deformation of the pad 3 is increased on the side of the spiral center 3b3.

Figure 6:
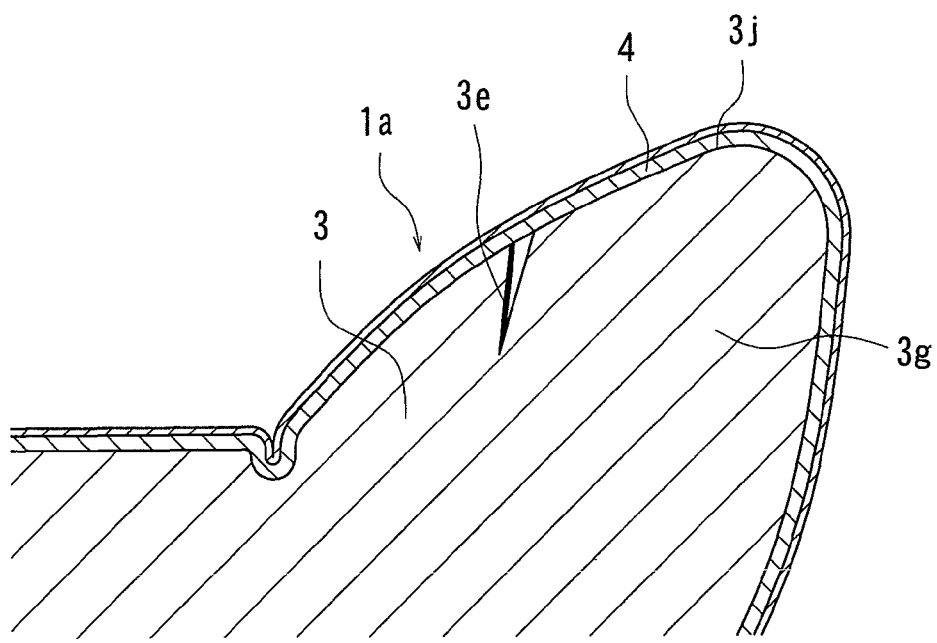
FIG. 6 is a part of a cross-sectional view taken along line VI-VI in FIG. 1.

As shown in FIGS. 2 and 6, the pad 3 includes a raised portion 3g at left and right end portions thereof for holding side portions of the hip portion and the thigh portion of the user. A rear side region of the raised portion 3g is formed with a groove 3e. The groove 3e is constituted by a shape of one piece line in which a plurality of S-shaped lines are continuously extended. A length in a front and rear direction can be defined as a quarter to half of, for example, a length in a front and rear direction of the pad 3, and a width is set to, for example, 30 to 150 mm. The groove 3e is inclined to a line orthogonal to the surface 3j of the pad 3. In detail, the groove 3e is inclined such that the bottom portion is disposed in the width center direction of the pad 3 more than the opening portion. Therefore, a side of the surface 3j of the raised portion 3g of the pad 3 can be easily elastically deformed toward a width outer side. Further, the groove 3e is extended in the S-like shape, and therefore, the raised portion 3g is elastically deformed in a predetermined width length.

As shown in FIG. 2, the pad 6 includes the groove 6a at a position in correspondence with the backbone of the user, that is, substantially at a center position in the width direction of the pad 6. The groove 6a is in a shape of a one piece line in which a plurality of S-shaped lines are continuously extended. The groove 6a is extended along substantially a center of the width of the pad 6 and a length thereof in the up and down direction is, for example, can be defined as half to three quarters of the length in the up and down direction of the pad 6. The length in the width direction of the groove 6a is, for example, 50 to 150 mm. A depth of the groove 6a increases from the lower side to the upper side of the seat back 1b as shown in FIG. 3. Therefore, the width center region of the pad 6 more easily be elastically deformed at the upper side portion. Further, because the depth of the groove 6a is changed in steps, or is tapered, the elastic deformation of the pad 6 becomes smooth and a strange feeling to the user is reduced.

Further, the groove 6a is inclined to a line orthogonal to the surface 6j of the pad 6 as shown in FIG. 3. In detail, the groove 6a is inclined such that the bottom portion is disposed on the lower side of the opening portion. Therefore, the width center region of the pad 6 can easily be elastically deformed in a direction of moving the side of the surface 6j to the upper side. On the other hand, the width center region of the pad 6 receives a force F2 in a rear upper direction from the side of the backbone of the user. Therefore, the width center region of the pad 6 can easily be deformed elastically. Further, the width center region of the pad 6 can be deformed elastically in a predetermined width length since the groove 6a is extended in an S-like shape.

As shown in FIG. 2, the grooves 6b and 6c are formed at left and right adjacent positions of the groove 6a. The grooves 6b and 6c are formed at positions in correspondence with the shoulder blade bones (expanded portions) of the user, that is, at left and right positions of an upper region of the pad 6. The grooves 6b, 6c are formed in a spiral shape and are formed similar to the groove 3b.

An upper end portion of the pad 6 is formed with the groove 6d along an upper end portion as shown in FIG. 2. The groove 6d is constituted by a shape of one piece line in which a plurality of S-shaped lines are continuously extended. A length in a width direction of the groove 6d is, for example, can be defined as half to three quarters of a width length of the pad 6, and a length in the upper and down direction is set to, for example, 50 to 150 mm. The groove 6d is provided with an angle of inclination relative to the surface 6j of the pad 6. In details, the groove 6*d* is inclined such that the bottom portion is disposed on the lower side of the opening portion as shown in FIG. 3.

Therefore, the upper end portion of the pad 6 can easily be deformed elastically in a direction of moving the side of the surface 6*j* to the upper side. Further, an upper end portion of the pad 6 can easily be deformed elastically in a predetermined length in the up and down direction since the groove 6*d* is extended in an S-like shape. Therefore, the upper end portion of the pad 6 is elastically deformed by a large amount when the user is tall, and is deformed by a small amount when the user is short.

Figure 5:
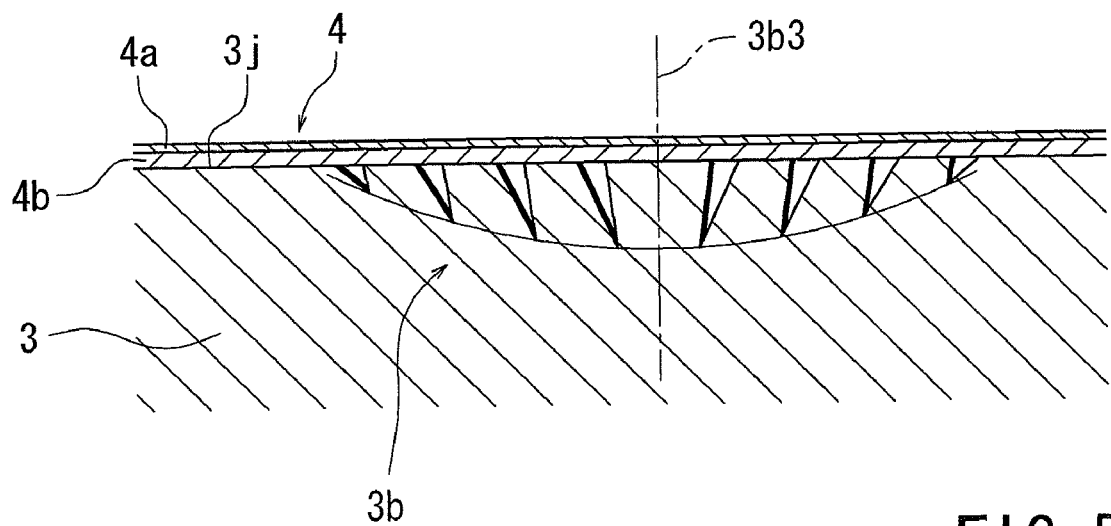
FIG. 5 is a cross-sectional view taken along line V-V in FIG. 4.

As shown in FIG. 5, the skin member 4 is integrally provided with a surface layer portion 4*a* and a back layer portion 4*b* adhered to a back face of the surface layer portion 4*a*. The surface layer portion 4*a* is formed from skin, fabric or the like. The back layer portion 4*b* is formed from a foamed elastic member and a thickness thereof is, for example, can be 5 to 15 mm. Also the skin member 7 is formed similar to the skin member 4. Further, sheets softer than the pads 3, 6 such as placed slabs or the like are not provided between the skin members 4, 7 and the pads 3, 6.

As described above, the surfaces 3*j*, 6*j* of the pads 3, 6 are formed with the grooves 3*a* through 3*e*, 6*a* through 6*d*. Further, the grooves 3*a* through 3*e*, 6*a* through 6*d* are inclined to a line 3*k*, 6*k* orthogonal to the surfaces 3*j*, 6*j* (refer to FIGS. 2, 3, 7). Therefore, the stiffness of the surface sides of the pads 3 and 6 may degrade because the grooves 3*a* through 3*e*, 6*a* through 6*d* are formed at the surfaces of the pads 3 and 6. Further, the pads 3, 6 are easy to be deformed in the desired direction along inclinations of the grooves 3*a* through 3*e*, 6*a* through 6*d*. Thereby, the seating comfortableness of the vehicular seat 1 can be promoted.

Further, the surfaces 3*j*, 6*j* of the pads 3, 6 are formed with the grooves 3*b* through 3*d*, 6*b*, 6*c* extended in the spiral shape as shown in FIG. 2. Therefore, deformation of the pads 3,6 can continuously and smoothly be carried by the grooves 3*b* through 3*d*, 6*b*, 6*c* in the spiral shape. With this configuration, the load applied to the pads 3, 6 is smoothly dispersed, and portions of the pads 3, 6 can be prevented from being recessed partially or suddenly. In this way, the seating comfortableness of the vehicular seat 1 can be promoted.

Further, the grooves 3*a* through 3*e*, 6*a* through 6*d* include pairs of the wall surfaces 9*d*, 9*e* (refer to FIG. 7). The wall surfaces 9*d*, 9*e* include skin layers formed when the grooves 3*a* through 3*e*, 6*a* through 6*d* are molded by molding dies, and the skin layers are harder than center portions of the pads 3, 6. However, both of the wall surfaces 9*d*, 9*e* are inclined in the same directions relative to lines 3*k*, 6*k* orthogonal to the surfaces 3*j*, 6*j* of the pads 3, 6. Therefore, the pads 3, 6 can easily be deformed elastically in desired directions regardless of the skin layer.

While the invention has been described with reference to specific configurations, it will be apparent to those skilled in the art that many alternatives, modifications and variations may be made. Accordingly, the present invention is intended to embrace all such alternatives, modifications and variations that may fall within the spirit and scope of the appended claims. For example, the present invention should not be limited to the representative configurations, but may be modified as described below.

Figure 8:
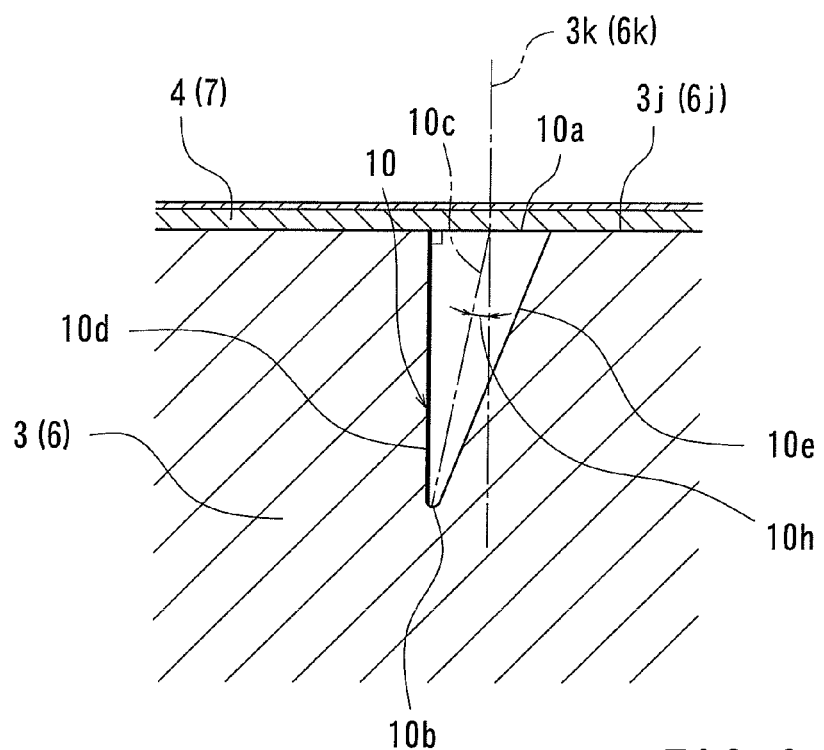
FIG. 8 is a cross-sectional view of a groove of another configuration of this present invention.

(1) For example, the grooves 3*a* through 3*e*, 6*a* through 6*d* can have a groove section 10 shown in FIG. 8 in place of the groove section 9 shown in FIG. 7. The groove section 10 includes an opening portion 10*a* and a bottom portion 10*b*, and is provided with an angle of inclination 10*h* between a groove center line 10*c* and the orthogonal line 3*k*, 6*k*. The groove section 10 can have a triangular shape and includes wall surfaces 10*d* and 10*e* opposed to each other, and the wall surface 10*d* is substantially in parallel with orthogonal line 3*k*, 6*k*. On the other hand, the wall surface 10*e* is inclined to the orthogonal line 3*k*, 6*k*.

Figure 9:
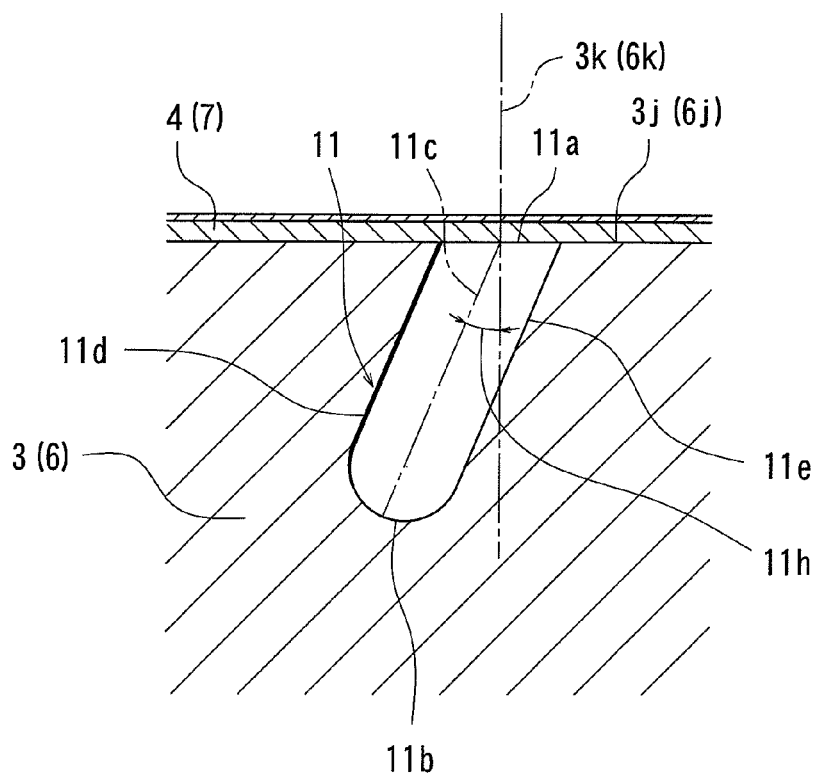
FIG. 9 is a cross-sectional view of a groove of the other configuration of this present invention.

(2) Further, the grooves 3*a* through 3*e*, 6*a* through 6*d* can have a groove section 11 shown in FIG. 9 in place of the groove section 9 shown in FIG. 7. The groove section 11 includes an opening portion 11*a* and a bottom portion 11*b*, and is provided with an angle of inclination 11*h* between a groove center line 11*c* and the orthogonal line 3*k*, 6*k*. The groove section 11 can be substantially a U-shape and includes constitutive wall surfaces 11*d*, 11*e* opposed to each other. The wall surface 11*d*, 11*e* are substantially in parallel with each other and both thereof are inclined in the same direction to the orthogonal line 3*k*, 6*k*.

(3) The vehicular seat 1 includes all of the grooves 3*a* through 3*e*, 6*a* through 6*d*. However, the seat can include a configuration having one or multiple other combinations of grooves 3*a* through 3*e*, 6*a* through 6*d*.

(4) The groove 3*a* is continuously provided with the pluralities of width direction grooves 3*a*1 and connecting grooves 3*a*2 and is formed of a one piece line. However, the groove 3*a* may be constituted by a configuration which includes only a plurality of rows of the width direction grooves 3*a*1 and does not include the connecting grooves 3*a*2.

(5) The depth of groove 3*a* is stepped or tapered in relation to each other. However, there may be constituted a configuration in which the depth of the groove 3*a* or the groove 6*a* is formed to be substantially constant.

(6) Although the grooves 3*b*, 3*c*, 6*b*, 6*c* are formed by the spiral shape, the grooves may be formed by a shape of concentric circles. In the case of the shape of concentric circles, it is preferable that the groove is inclined such that the bottom portion is disposed on the side of the center of the shape of concentric circles more than the opening portion. Further, it is preferable that the groove portion closer to the center thereof, the deeper the groove width.

(7) Although each of the grooves 3*a* through 3*e*, 6*a* through 6*d* is constituted by a shape of one piece line, the each of the grooves may be constituted by plural lines which are assembled.

What is claimed is:

1. A vehicular seat comprising:
   a seat cushion including a pad, the pad including a foamed elastic material;
   a skin member covering a surface of the pad; and
   a groove defined in the surface of the pad, the groove having an opening portion and a bottom portion,
   wherein the groove is inclined to a line orthogonal to the surface of the pad,
   wherein the groove is formed proximate a front side of the pad extended in a width direction,
   wherein the bottom portion of the groove extends, relative to the opening portion of the groove, in a direction towards a rear side of the pad such that the bottom portion is closer to the rear side of the pad than the opening portion,
   wherein the groove is configured as a plurality of rows positioned at a front side portion of the seat cushion and extend in a width direction and are aligned in a front and rear direction, and
   wherein a depth of the row is tapered from a front side to a rear side of the seat cushion, the row closest to the front side of the seat cushion has the largest depth.

2. The vehicular seat as in claim 1, wherein the groove includes a pair of wall surfaces opposed to each other, and the pair of wall surfaces are inclined in the same direction relative to the line orthogonal to the surface of the pad.

3. The vehicular seat as in claim 1, further including a seat back;
   wherein a seat back pad is formed with a seat back groove, the seat back groove being a one piece line in which a plurality of S-shaped lines are continuously extended; and
   wherein the seat back groove is inclined such that a bottom portion is closer to a bottom side of the seat back pad than an opening portion of the seat back groove.

4. The vehicular seat as in claim 3, wherein the seat back groove is substantially centered in the width direction of the seat back.

5. The vehicular seat as in claim 4, wherein a depth of the seat back groove is tapered from a top side to a bottom side of the seat back, the top side portion of the seat back groove has the largest depth.

6. The vehicular seat as in claim 3, wherein the seat back groove is formed along an upper end portion of the seat back.

7. A vehicular seat comprising:
   a seat cushion including a pad, the pad including a foamed elastic material;
   a skin member covering a surface of the pad; and
   a groove defined in the surface of the pad, the groove having an opening portion and a bottom portion,
   wherein the groove is inclined to a line orthogonal to the surface of the pad,
   wherein the groove is at least one of a spiral shape and a concentric circle shape,
   wherein the groove is inclined such that the bottom portion thereof is disposed on a center side of the groove more than the opening portion thereof, and
   wherein a depth of the groove is tapered from the center side to an outer side of the groove, the center side portion of the groove has the largest depth.

8. The vehicular seat as in claim 7, wherein the groove is formed at a position in correspondence with at least one of shoulder blade bones, hip bones or a tailbone of a user.

9. A vehicular seat comprising:
   a pad including a foamed elastic material; and
   a skin member covering a surface of the pad;
   wherein a groove is formed at the surface of the pad, the groove extends in a spiral shape along the surface,
   wherein the groove is inclined such that a bottom portion thereof is disposed on a center side of the spiral shape more than an opening portion thereof, and such that the groove can be elastically deformed to disperse a force applied to the pad from the center side of the spiral shape towards an outer side thereof, and
   wherein the groove includes a pair of wall surfaces opposed to each other, and both of the pair of wall surfaces are inclined in the same direction relative to a line orthogonal to the surface of the pad.

10. The vehicular seat as in claim 9, wherein a depth of the groove is tapered from a center side to an outer side of the groove, the center side portion of the groove has the largest depth.

11. The vehicular seat as in claim 9, wherein the groove is formed at a position in correspondence with at least one of shoulder blade bones, hip bones or a tailbone of a user.

* * * * *